United States Patent [19]

Johnson et al.

[11] Patent Number: 4,954,553

[45] Date of Patent: Sep. 4, 1990

[54] MODIFIED WATERBORNE PHENOXY RESINS

[75] Inventors: Robert N. Johnson, Basking Ridge, N.J.; Ismael Colon, Cary, N.C.

[73] Assignee: Union Carbide Chemicals and Plastics Company Inc., Danbury, Conn.

[21] Appl. No.: 251,253

[22] Filed: Sep. 30, 1988

[51] Int. Cl.$^5$ ............................................. C08K 5/06
[52] U.S. Cl. ........................................ 524/376; 428/418; 428/457; 523/334; 524/501; 524/539; 524/540; 525/930
[58] Field of Search ............... 524/611, 501, 539, 540, 524/591, 604, 376, 377; 523/501, 334; 525/930, 396, 397; 428/418, 457

[56] References Cited

U.S. PATENT DOCUMENTS

| | | | |
|---|---|---|---|
| 2,602,075 | 7/1952 | Carpenter et al. | 528/95 |
| 3,177,089 | 4/1965 | Marshall et al. | 428/537.1 |
| 3,177,090 | 4/1965 | Bayes | 525/930 |
| 3,297,784 | 1/1967 | Snedeker et al. | 525/930 |
| 3,699,070 | 10/1972 | Wynstra | 523/402 |
| 3,925,504 | 12/1975 | Koleske et al. | 525/930 |
| 4,128,515 | 12/1978 | Tobias et al. | 523/402 |
| 4,141,871 | 2/1979 | Shimp et al. | 523/334 |
| 4,256,622 | 3/1981 | Smith | 524/376 |
| 4,337,330 | 6/1982 | Robeson | 525/407 |
| 4,355,122 | 10/1982 | Fan | 525/930 |
| 4,370,382 | 1/1983 | Salensky | 523/451 |
| 4,391,855 | 7/1983 | Geeck | 524/317 |
| 4,476,260 | 10/1984 | Salensky | 523/402 |
| 4,511,682 | 4/1985 | Mayer et al. | 524/539 |
| 4,559,247 | 12/1985 | Kopf et al. | 525/930 |
| 4,638,038 | 1/1987 | Salensky | 525/533 |

*Primary Examiner*—Veronica P. Hoke
*Attorney, Agent, or Firm*—Jean B. Mauro

[57] ABSTRACT

Waterborne, neutralized, carboxyl-bearing phenoxy resin with which is blended a relatively soft, neutral, non-carboxyl-bearing modifier resin. A coalescing solvent is preferably included in the aqueous blend.

23 Claims, No Drawings

MODIFIED WATERBORNE PHENOXY RESINS

BACKGROUND OF THE INVENTION

1. Field of the Invention

This invention relates to waterborne phenoxy resins which are blended with modifier resins to provide significant improvements in key properties.

2. Description of the Prior Art

Phenoxy resins, sometimes referred to as "thermoplastic polyhydroxyethers," are known in the art as components of corrosion-resistant coatings, e.g., zinc-rich coatings for metallic substrates, as described in U.S. Pat. Nos. 4,370,382, 4,391,855 and 4,476,260. Phenoxy-based coatings have not, however, proven to be entirely satisfactory.

More specifically, prior phenoxy-based coatings have not provided satisfactory adhesion to smooth substrates, e.g., metallic substrates, and have been subject to degradation by corrosion, particularly in high humidity environments. To obviate such problems, U.S. Pat. No. 4,638,038 discloses a phenoxy resin having pendant secondary hydroxyl groups of which about 3 to about 50 percent of such hydroxyl groups have been reacted to produce moieties having pendant carboxyl groups. Such hydroxyl-reacted carboxylic acid-containing phenoxy resins can be used as general purpose and corrosion-resistant coatings, useful in water-dispersable coatings, adhesives and laminating systems.

However, it would be desirable to provide a resin system that would offer even further improved performance. As an example, the hydroxyl-reacted, carboxylic acid-based phenoxy resins generally produce milky-white dispersions in water with relatively limited shelf stability. Additionally, it would be desirable to be capable of offering more flexible coatings having lower viscosities, providing the potentiality for much higher solids contents.

Phenoxy resin blends with relatively softer resins have been found useful in making various injection molded products. Blends of phenoxy resins with relatively softer resins are thus described in U.S. Pat. Nos. 3,925,504 and 4,337,330.

While such coatings provide excellent corrosion resistance on non-deformed surfaces, these coatings are often not fully satisfactory for uses in which the substrate and coating undergo substantial deformation, or where bake temperatures of less than about 400° F. are used (such uses often being termed "low bake" systems). As illustrative examples of such uses, there can be mentioned the stamping and forming of sheet metal, as in the automobile manufacturing industry. As a result of such deformation, corrosion resistance can be seriously degraded.

European published application No. 86113893.1 (equivalent to co-pending U.S. application Ser. No. 850,783) discloses a formable coating composition comprising a phenoxy resin and about 1 to about 50 percent by weight of the total resin of a modifier resin which is relatively soft in comparison to the phenoxy resin, is compatible with the phenoxy resin, and has specific reduced viscosity, glass transition temperature, solubility and molecular weight characteristics. By the term "formable compositions" it is meant that the coating is able to withstand physical operations to the substrate (e.g., rolling, bending, stamping, cutting, etc.) without significant damage to the continuity and adhesion of the coating. Accordingly, the protective properties of the coating are preserved.

Waterborne phenoxy resins are known (U.S. Pat. No. 4,355,122), as are coatings made therefrom (U.S. Pat. No. 4,374,875). These resins are listed in Title 175.300 of Chapter 21, CRF, of the U.S. Food and Drug Administration.

In view of the general trend toward waterborne systems within the coatings industry, it would be desirable to provide a waterborne phenoxy resin system which provides an adequately flexible coating, even when crosslinked. Further, it would be desirable to provide such a waterborne phenoxy resin system which is characterized by a relatively low viscosity in comparison to phenoxy resin coatings so as to provide the potential for a much higher resin or solids content. It would additionally be desirable to provide systems of this sort which permit lower bake temperatures to form coatings which are characterized by further improved corrosion resistance. Importantly, it would be particularly desirable to provide an improved phenoxy resin system which remains stable upon storage and does not gel upon such storage for long periods of time and which likewise remains stable even when pigmented.

Significant improvements to certain water-borne phenoxy systems are described in co-pending U.S. application Ser. No. 078,277, filed July 27, 1987 now abandoned. That application provides a waterborne coating composition comprising a blend of phenoxy resin and from about 5 to about 50 percent, by weight of the total resin, of a modifier resin, compatible with the phenoxy resin, and being relatively soft in comparison thereto, and having:

(1) a reduced viscosity of about 0.1 to about 2, preferably about 0.2 to about 1, dL/g in tetrahydrofuran at 25° C.;

(2) a glass transition temperature (Tg) of about $-120$ to about 30, preferably about $-100$ to about 0° C.; and (3) a number average molecular weight of about 500 to about 10,000, most typically from about 500 to 3,000. Both the phenoxy and the modifier resin must contain hydroxyl groups, and about 3 to about 50 percent of the total hydroxyl groups present are reacted to produce moieties having carboxyl groups, which are then neutralized to render the blend waterborne.

In creating products for the coatings industry, it is imperative to address the regulations of the EPA of the U.S. Government relating to Volatile Organic Content ("VOC"). Although the prior art systems described above are capable of producing room-temperature-filming, highly-flexibilized phenoxy and epoxy coatings, they are produced via solvent processes and their coating processes usually involve high levels of coalescing solvents, and therefore they significantly exceed current VOC standards for compliance. In general, the lower the bake temperature, the higher the VOC because more coalescing solvent is needed to film the resin. On the other hand, at low levels of coalescing solvent, clear films can not ordinarily be produced by drying at low (e.g., room) temperatures.

SUMMARY OF THE INVENTION

According to the present invention there are provided waterborne, flexibilized, blended compositions, suitable for coatings and other applications, which achieve their beneficial results without exceeding current VOC standards as set forth by the EPA. In addition, the compositions of this invention admit of substantial diversity of formulation, thus permitting achievement of lower minimum filming temperature, excellent air-dry capability, high gloss, improved flexibility, good hardness, good adhesion, and good crosslinkability. It is a particularly desirable feature of the present invention that both the preferred phenoxy resin and its flexibilizing modifier can be selected from those materials listed in Title 175.300 of Chapter 21, CRF, of the U.S. Food and Drug Administration. Accordingly, the present invention comprises:

An aqueous coating composition comprising:

(a) a waterborne, neutralized, carboxyl-bearing phenoxy resin, (b) about 5 to about 50% by weight of the total resin of a modifier resin which is relatively soft in comparison to the phenoxy resin and is compatible with the phenoxy resin and has:

(1) a reduced viscosity of about 0.1 to about 2dL/g, preferably about 0.2 q. to about 1dL/8, in tetrahydrofuran at 25° C.;

(2) a Tg of about $-120$ to about 30° C., preferably about $-100$ to about 0° C.;

(3) a solubility in Cellosolve acetate at 25° C. of at least about 1 g per 100g of solvent;

(4) a molecular weight of about 500 to about 90,000, said modifier resin being a neutral, non carboxyl-bearing, liquid or waterborne resin which will form a clear film with the waterborne phenoxy resin at 25°-300° C. upon evaporation of any solvents and all the water in the system;

(c) preferably, about two to about by weight of the total emulsion of a coalescing solvent, with a relative evaporation rate above about 0.001 (butyl acetate=100), for the waterborne phenoxy-modifier resin mixture;

(d) optionally, a particulate material;

(e) optionally, a crosslinker;

(f) water in an amount sufficient to disperse the phenoxy and modifier resins therein.

The present invention also comprises a method for preparing a coating composition as above described, said method comprising:

(a) adding, with agitation and at a temperature of about 25 to about 40° C., water to a waterborne, neutralized, carboxyl-bearing phenoxy emulsion, said water being sufficient in amount to result in a phenoxy solids concentration of about 20 to about 30g by weight;

(b) increasing the temperature of the emulsion to about 50 to about 60° C.;

(c) adding, at increased agitation, about 5 to about 50% by weight of the total resin of a modifier resin which is a neutral, non-carboxyl-bearing, liquid or waterborne resin which will form a clear film with the waterborne phenoxy resin at 25-300° C. upon evaporation of any solvents and all the water in the system;

(d) cooling the composition to room temperature;

(e) preferably, adding, with agitation, about 2 to about 25% by weight of the total emulsion of a coalescing solvent, with a relative evaporation rate above about 0.001 (butyl acetate=100), for the waterborne phenoxy-modifier resin mixture.

DETAILED DESCRIPTION OF THE INVENTION

The Phenoxy Resin

The phenoxy resins suitable for uses in the present invention are of the waterborne type, preferably those prepared according to the general procedures described in U.S. Pat. Nos. 4,355,122, and 4,638,038, the disclosures of which are incorporated herein by reference. In essence, such waterborne phenoxy resins are prepared in either of two methods.:

In the first method they are prepared by:

(1) grafting onto normally solid thermoplastic polyhydroxyether one or more ethylenically unsaturated hydrocarbon monomers having 3 to about 8 carbons at least one of said monomers containing sufficient carboxyl groups to provide from about 1 carboxyl group per 10 monomeric units of thermoplastic polyhydroxyether to about 10 carboxy groups per each monomeric unit of polyhydroxyether; and (2) blending said grafted thermoplastic polyhydroxyether in a high turbulence field with:

(a) water, (b) a water-miscible organic solvent in which said thermoplastic polyhydroxyether is soluble until an ionomer of the grafted thermoplastic polyhydroxyether is obtained as a colloidal dispersion, said thermoplastic polyhydroxyether having the general formula:

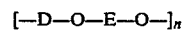

wherein D is the radical residium of a dihydric phenol, E is an hydroxyl-containing radical residium of an epoxide, and n represents the degree of polymerization and is at least about 30.

The resulting waterborne phenoxy must be at least partially neutralized to raise its pH to the range of about 6 to about 11, preferably about 7 to about 9. Neutralization can be effected by any of various well-known organic amines, e.g., ethanol amine, but other well-known neutralizing agents can also be used. In addition, the waterborne phenoxy should contain reactive hydroxyl functionality.

Useful waterborne phenoxy dispersions are available from the Union Carbide Corporation, Danbury, CT. In general, the suitable materials are amine-neutralized, surfactant-free colloids, with excellent emulsion and viscosity stability. Such dispersions are currently available at a choice of solids contents, molecular weights, and particle sizes. In addition, these products are available with an optional choice of "coalescing solvents" which aid in coalescing the phenoxy particles into a continuous coating. Such solvents include Butyl Cellosolve and Butyl Carbitol, among others.

In the second method they are prepared by reaction of monoanhydrides of di- or polycarboxylic acids with a certain proportion, preferably about 5 to about 25%, of the secondary hydroxyl groups present on the resin's polymeric chain. In general, the polymer should have a molecular weight of about 15,000 to about 45,000, preferably about 22,000 to about 37,000, and ideally about 30,000. It is imperative that a monoester be formed and that diester formation be as close to nil as possible. In addition, the phenoxy resin should contain little or no epoxide functionality, thereby avoiding any possible reaction with the carboxyl groups.

The terms "thermoplastic poly(hydroxyether)" and "phenoxy" herein refer to substantially linear polymers having the general formula:

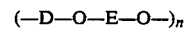

wherein D is the radical residuum of a dihydric phenol, E is an hydroxyl-containing radical residuum of an epoxide, and n represents the degree of polymerization and is at least 30 and is preferably 80 or more. The term "thermoplastic poly(hydroxyether)" is intended to include mixtures of at least two thermoplastic poly(hydroxyethers).

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide, generally in an aqueous medium, at a temperature of about 10° to about 50° C. until at least about 60mole percent of the epihalohydrin has been consumed. The thermoplastic poly(hydroxyethers) thus produced have reduced viscosities of at least about 0.4. Reduced viscosity values are computed by use of the equation:

$$\text{Reduced Viscosity} = \frac{t_s - t_o}{ct_o}$$

wherein $T_o$ is the efflux time of the solvent (tetrahydrofuran), $t_s$ is the efflux time of the poly(hydroxyether) solution, c is the concentration of the poly(hydroxyether) solution in grams of poly(hydroxyether) per 100 ml. of tetrahydrofuran.

The dihydric phenol contributing the phenol radical residuum, D, can be either a dihydric mononuclear or a dihydric polynuclear phenol such as those having the general formula:

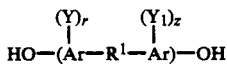

$$HO-(Ar-R^1-Ar)-OH$$

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —SO$_2$— and —S—S—, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals, as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by a aromatic ring, a tertiary amino group, an ether linkage, a carbonyl group or a sulfur-containing group such as sulfoxide, and the like.

Examples of specific dihydric polynuclear phenols include, among others:

The bis(hydroxyphenyl)alkanes, such as 2,2-bis(4-hydroxyphenol)propane, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl ethane, 1,2-bis(4-hydroxyphenyl-ethane, 1,1-bis(4-hydroxy-2-chlorophenyl)ethane, 1,1-bis(3-methyl-4-hydroxyphenyl)ethane, 1,3-bis(3-methyl-4-hydroxyphenyl)propane, 2,2-bis(3-phenyl-4-hydroxyphenyl)-propane, 2,2-bis(3-isopropyl-4-hydroxyphenyl)propane, 2,2-bis(2-isopropyl-4-hydroxyphenyl)propane, 2,2-bis(4-hydroxylnaphthyl)propane, 2,2-bis(4-hydroxyphenyl)pentane, 3,3-bis(4-hydroxyphenyl)pentane, 2,2-bis(4-hydroxyphenyl)heptane, bis(4-hydroxyphenyl)phenylmethane. bis(4-hydroxyphenyl)cyclohexylmethane, 1,2-bis(4-hydroxyphenyl-1,2-bis(phenyl)propane, 2,2-bis(4-hydroxyphenyl)-1-phenylpropane, and the like;

di(hydroxyphenyl)sulfones, such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

di(hydroxyphenyl)ethers, such as bis(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis(4-hydroxy-3-fluorophenyl)ether, bis(4-hydroxy-3-bromophenyl)ether, bis(4-hydroxynaphthyl)ether, bis(4-hydroxy-3-chloronaphthyl)ether, bis(2-hydroxydiphenyl)ether, 4,4'-dihydroxy-2,6-dimethoxydiphenyl ether, 4,4-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane, as well as bisphenols such as 1,3,3'-trimethyl-1-(4-hydroxyphehyl)-6-hydroxyindane, and 2,4-bis(4-hydroxyphenyl)-4-methylpentane, and the like.

Particularly desirable dihydric polynuclear phenols have the formula

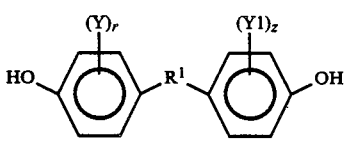

wherein Y and $Y_1$ are as previously defined, r and z have values from 0 to 4, inclusive, and $R^1$ is a divalent, saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxylcontaining radical residuum, E, can be monoepoxide or diepoxide. By "epoxide" is meant a compound containing an oxirane group, i.e., oxygen bonded to two vicinal aliphatic carbon atoms, thus,

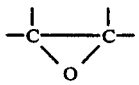

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$, and acetylenic unsaturation, i.e., $-C\equiv C-$, are preferred. Particularly preferred are halogen substituted saturated monoepoxides, i.e., the epihalohydrins, and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen, $-O-$, oxacarbonyl oxygen

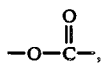

carbonyl oxygen

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane. 1,2-epoxy-2-methyl-3-fluoropropane, and the like.

Illustrative diepoxides include diethylene glycol bis(3,4-epoxycyclohexane-carboxylate), bis(3,4-epoxycyclohexylmethyl)adipate, bis(3,4-epoxycyclohexylmethyl)phthalate, 6-methyl-3,4-epoxycyclohexylmethyl-6-methyl-3,4-epoxycyclohexane carboxylate, 2-chloro-3,4-epoxycyclohexylmethyl-2-chloro-3,4-epoxycylohexane carboxylate, diglycidyl ether, bis(2,3-epoxycylopentyl)ether, 1,5-pentanediol bis(4-methyl-3,4-epoxycyclohexyl-methyl)ether, bis(2,3-epoxy-2ethylhexyl)adipate, diqlycidyl maleate, diqlycidyl phthalate, 3-oxa-tetracyclo[4.4.0.1$^{7,10}$.0$^{2,4}$]-undec-8-yl-2,3-epoxypropyl ether, bis(2,3-epoxycyclopentyl)-sulfone, bis(3,4-epoxyhexoxypropyl)sulfone, 2,2'-sulfonyl-diethyl, bis(2,3-epoxycyclopentanecarboxylate), 3-oxatetracyclo[4.4.0.1$^{7,10}$.0$^{2,4}$]-undec-8-yl-2,3-epoxybutyrate, 4-pentenal-di(6-methyl-3,4-epoxycyclohexylmethyl)acetal, ethylene glycol bis(9,10-epoxystearate), diqlycidyl carbonate, bis(2,3-epoxybutylphenyl)-2-ethylhexyl phosphate, diepoxydioxane, butadiene dioxide, and 2,3-dimethyl butadiene dioxide. The preferred diepoxides are those wherein each of the oxirane groups is connected to an electron-donating substituent which is not immediately connected to the carbon atoms of that oxirane group. Such diepoxides have the grouping:

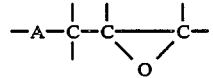

wherein A is an electron-donating substituent such as

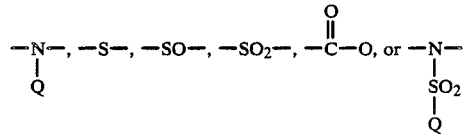

and Q is a saturated hydrocarbon radical such as an alkyl, cycloalkyl, aryl or aralkyl radical.

The preferred polyhydroxyether is available commercially as UCAR Phenoxy PKHH, a trade nation of Union Carbide Corporation for a condensation polymer derived firm bisphenol-A (2,2-bis(p-hydroxyphenyl)-propane and epichlorohydrin) having the structural formula:

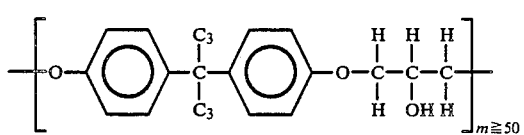

The phenoxy resin is available as a solution in glycol ether esters such as Cellosolve acetate (the acetate of a monoalkyl glycol ether sold under the trademark "Cellosolve" by Union Carbide Corporation) or in pellet form which is readily soluble in a variety of solvents and solvent blends. The solid phenoxy resin sold under the designation PKHH by Union Carbide Corporation is soluble in the following solvents: butyl Carbitol, butyl Carbitol acetate, butyl Cellosolve, Carbitol solvent, Cellosolve acetate, Cellosolve solvent, diacetone alcohol, diethyl Carbitol, dimethylformamide, dimethyl sulfoxide, dioxane, ethoxy triglycol, mesityl oxide, methyl Cellosolve acetate, methyl ethyl ketone, and tetrahydrofuran.

(Carbitol is a Trademark of Union Carbide Corporation for the monoalkyl ether of diethylene glycol.)

The preparation of the above-described polyhydroxyethers is described in U.S. Pat. No. 3,305,528.

In addition to these polyhydroxyethers, one may also employ the linear thermoplastic polyethers described in U.S. Pat. No. 3,117,089, U.S. Pat. No. 3,306,872, and U.S. Pat. No. 2,602,075.

The resulting grafted phenoxy resin must be at least partially neutralized to raise its pH to the range of about 6 to 9.5, preferably about 7.0 to 7.5. Accordingly, about 50% to about 100%, preferably about 85 to about 100%, of the available carboxyl groups are neutralized. Neutralization can be effected by any of various well-known primary, secondary, tertiary alkyl, alkanol, and aromatic and alkanol-alkyl mixed amines, e.g., monoethanolamine, dimethylethanolamine, diethylethanolamine, diethanolamine, morpholine, N-methylmorpholine, N-ethylmorpholine, triethylamine, 2-dimethylamino-2-methyl-1-propanol, 2-amino-2-methyl-1-propanol, and dimethylaniline, but other useful neutralizing agents, such as ammonium hydroxide or mixtures with amines, can be cited as well.

Ordinarily, the neutralization is done by adding the amine to the grafted phenoxy resin which is already dissolved in the water-miscible organic solvent; said solvent is the same one that was used for preparing the grafted phenoxy resin. This normally is done at room temperature, with vigorous agitation; however, higher temperatures, up to about 5 to 10 degrees below the boiling point of the solvent, are permitted.

The grafted phenoxy resins that are used in this application and that are dissolved in the water-miscible solvents are also combined with a coalescing solvent.

A coalescing solvent is a high boiling solvent that is incorporated into the water dispersion of the waterborne phenoxy resin to aid in film formation and is a well-known procedure in the filming of waterborne resins in general. By definition, a coalescing solvent is a solvent that will soften the waterborne phenoxy resin particles enabling them to fuse together into a clear continuous film during the drying of the coating. Film formation occurs through a combination of capillary action resulting from the evaporation of water and polymer flow through the action of the coalescing solvent. The efficacy of a coalescing solvent for the waterborne phenoxy resin particles is determined by three factors: the evaporation rate relative to water, its efficiency in plasticization, and its ability to lower the surface tension of the aqueous phase. To work properly, the coalescing solvent must evaporate at such a rate that a sufficient amount remains to soften the waterborne phenoxy resin particles after all the water has evaporated. If the water evaporates slowly compared to the coalescing solvent, then the waterborne phenoxy resin particles will not flow together upon contact during the drying of the coating; thus, fusion of the particles will not occur and the resulting coating will be extremely brittle and will not form a continuous, clear film. As stated, the efficiency of a coalescing solvent also depends on its ability to soften or plasticize the waterborne phenoxy resin particles; the coalescing solvent also lowers the viscosity and the glass transition temperature of the particles; thus, its solubility in the waterborne phenoxy resin particles is important. Coalescing solvents that are poorly water soluble but good solvents for the waterborne phenoxy have high efficiency because more of the solvent is available for the resin particle phase. On the other hand, some water-miscible coalescing solvents are very effective in lowering of the surface tension of the aqueous phase. This is important because a continuous film also will not form unless the surface being coated is fully wet out or leveled by the waterborne phenoxy dispersion. Wet-out problems arise in aqueous coatings systems because the surface tension of water is very high compared to common coating substrate surfaces, such as metals. Continuous coatings usually cannot be prepared unless the surface tension of the aqueous coating system is lower than that of the surface being coated. Thus, it is advantageous to use combinations of coalescing solvents to strike the optimum balance of these requirements for use in the waterborne phenoxy resin system. Coalescing solvents are also known to be important in the control of gloss and adhesion in waterborne coating systems.

A variety of organic solvent materials, including blends, may be used as coalescing solvents for waterborne phenoxy resins. The most important class is the one known as the glycol ethers and their esters. Examples selected from the list of the very large number of those in this class that are useful for waterborne phenoxy resins include: ethylene glycol methyl ether, ethylene glycol ethyl ether, ethylene glycol propyl ether, ethylene glycol butyl ether (also known as Butyl Cellosolve ® Solvent), ethylene glycol hexyl ether (also known as Hexyl Cellosolve ® Solvent), ethylene glycol phenyl ether, and the like; diethylene glycol methyl ether, diethylene glycol ethyl ether, diethylene glycol propyl ether, diethylene glycol butyl ether (also known as Butyl Carbitol ® Solvent), diethylene glycol hexylether, and the like; methyl ether of triethylene glycol, ethyl ether of triethylene glycol, butyl ether of triethylene glycol, and the like; propylene glycol methyl ether, propylene glycol ethyl ether, propylene glycol propyl ether, propylene glycol butyl ether, propylene. glycol t-butyl ether, and the like; propylene glycol n-gutoxyethyl ether, and the like; dipropylene glycol methyl ether, dipropylene glycol propyl ether, dipropylene glycol butyl ether, and the like; ethylene glycol methyl ether acetate, ethylene glycol ethyl ether acetate, ethylene glycol butyl ether acetate, and the like; diethylene glycol ethyl ether acetate, diethylene glycol butyl ether acetate, and the like; propylene glycol methyl ether acetate, and the like; dipropylene glycol methyl ether acetate, and the like. Especially useful solvents from this class for waterborne phenoxy resins include Butyl Cellosolve ® Solvent, Butyl Carbitol ® Solvent, and Hexyl Cellosolve ® Solvent, including mixtures of the same.

Miscellaneous solvent materials that can be used, especially in conjunction with a glycol ether or ester listed above, include aliphatic esters such as hexyl acetate, ethyl 3-ethoxypropionate, 2,2,4-trimethyl-1,3-pentanediol monoisobutyrate, and the like; higher ketones such as methyl n-amyl ketone and the like; simple glycols such as propylene glycol, butylene glycol, hexylene glycol, and the like; and simple alcohols such as butyl, hexyl, and the like.

The blending with coalescing solvent can be performed either before the neutralization or after. This is normally done at room temperature or elevated temperatures, is is done with the amine neutralant. The amount of coalescing solvent that is used is minimized according to the need to provide the lowest VOC in the final dispersion consistent with the need to provide a waterborne phenoxy resin dispersion that will be stable towards settling and provide coatings that will have a highly glossy appearance after the solvent has evaporated. A coalescing solvent level of about 10% by weight of the total resin solids will provide a dispersion that will have the desired characteristics as described above. While higher coalescing solvent levels are not needed to provide coatings of excellent appearance, levels as high as about 50% of the total resin solids can be used where required in special situations where smooth leveling or flowout of the waterborne phenoxy resin dispersion is difficult to achieve. This situation can be encountered with certain substrate surfaces where the waterborne phenoxy resin dispersion tends to form a coating with incomplete coverage or with an uneven, mottled or pinholed appearance. This problem is recognized by those skilled in the coatings art to be due to a wetting problem as a result of a poor match in surface tension between the substrate surface and the waterborne phenoxy dispersion. Increasing the amount of coalescing solvent in the waterborne phenoxy dispersion decreases its surface tension, resulting in an ability to flow out and wet these difficult surfaces more easily.

The dispersions are prepared by vigorously mixing the grafted phenoxy resins dissolved in the water-miscible solvents with water. While it is preferred that the amine and coalescing solvent be combined with the grafted phenoxy resin first before mixing with the water, optionally part or all of the amine and part o all of the coalescing solvent can be mixed with the water before mixing with the grafted phenoxy resin dissolved in the water-miscible solvent. It is also optional whether the water optionally containing part or all of the amine and coalescing solvent is added to the grafted phenoxy resin dissolved in the water-miscible solvent, or vice-versa. Mixing is continued until the dispersions are totally inverted from the water-in-oil state to the oil-in-water state. This is signaled by the attainment of the lowest viscosity with continued mixing and the demonstration of total water dispersability without formation of seeds or coagulated or agglomerated resin particles, upon dilution of the initial dispersion with more water. The amount of water used can vary depending on the final solids-viscosity desired. High levels of water would be used where a low final viscosity is desired. Use of low levels of water, however, is preferable from the standpoint of the economics of the process, not only in economizing in the reactor space but in the merchandizing and shipment of the final product where the highest solids are desired. With these considerations in mind, water levels as low as about 1 volume of water per 1.3 volumes of the grafted and neutralized phenoxy resin dissolved in the water-miscible solvent containing the coalescing solvent will provide a dispersion that will have a viscosity in a convenient range of about 100 to less than 4000 cps at a weight solids level of between 26 and 38%, after removal of all of the water-miscible solvent. Removal of the water-miscible solvent can be accomplished by simple distillation under a vacuum of about 60 mm. of mercury.

In general, the suitable waterbone phonoxy resin materials are amine-neutralized, surfactant-free colloids, with excellent emulsion and viscosity stability. Such dispersions are currently available at a choice of solids contents ranging from about 25% to about 38%, a choice of molecular weights ranging from about 6000 to about 200,000, and a choice of particle sizes ranging from about 0.2 micron to about 1.5 microns. In addition, these products are available with an optional choice of coalescing solvents, including Butyl Cellosolve ® Solvent and Butyl Carbitol ® Solvent.

The phenoxy reins that are prepared by esterification of the phenoxy hydroxyls by anhydrides according to the general procedure descirbed in U.S. Pat. No. 4,638,038 can also be used in the present invention, but are not preferred because they are not included in the list of approved materials in Title 175.300 of Chapter 21, CRF, of the U.S. Food and Drug Administration. Also, while these resin are improved over typical polyesters in hydrolytic stability because the ester linkages are fewer in number and are somewhat sterically hindered, stability in aggressive acidic or basic environments at elevated temperatures is inferior to the preferred phenoxy resins, because the grafts in the preferred phenoxy resins are made by carbon-to-carbon attachments to the phenoxy backbones, where the rates of hydrolysis are infinitesimally small even under the most extreme conditions of temperature and acidity or bacisity.

The Modifier Resin

Suitable modifier resins may be solids or liquids at room temperature. Since the phenoxy is waterborne, it is recommended that the modifier resin also be in waterborne form for ease of addition and mixing, as well as to minimize organic solvents. In many cases, a modifier resin which is solid at room temperature need not be separately emulsified, but may instead be melted and added with good stirring to the waterborne phenoxy emulsion.

Another useful option is to dissolve the modifier in the water-miscible solvent containing the grafted phenoxy resin prior to making the dispersion. However, it is preferred to add the modifier to the already-made dispersion because this provides broader flexibility in the manufacturing process, where both modified and unmodified products are being made in the same unit. Also, adding the modifier before making the dispersion requires more careful control of the water levels, mixing rates,. and temperatures in the dispersing step and in the solvent removal step in order to avoid problems with premature coalescence of the dispersed resin particles.

The modifier resins useful in this invention are generally amorphous thermoplastic resins, but it is possible to use crystalline resins, provided the mixture of the modifier resin with the phenoxy is generally amorphous. The modifier resins are relatively soft in comparison with the phenoxy resin. By the term "relatively soft" is meant that the modifier resin has a tensile modulus of less than about 70,000 psi at room temperature.

In addition, the useful modifier resins are essentially non-ionic and must be compatible with the phenoxy resin. By the term "compatible" is meant that a homogeneous mixture is obtained at room temperature having a single phase and a single Tg.

Moreover, useful modifier resins must meet the specific criteria identified above as to reduced viscosity, molecular weight, glass transition temperature, and solubility in Cellosolve acetate.

Suitable general classes of polymers that are compatible with phenoxy are: polyesters, polyester urethanes, polyether urethanes, and polyalkylene ethers (such as Polyox, polyethylene glycols, polyether polyols, and UCON ® fluids). Among the preferred materials are aliphatic polyesters, such as those derived from epsilon-caprolactone. These include a variety of lactone-based polyols and polymers, for example TONE TM polyols and polymers available from Union Carbide Corporation, as described in U.S. Pat. No. 3,169,945. These materials are produced by the catalytic polymerization of an excess of a lactone, e.g. caprolactone, and an organic polyfunctional initiator having a least two reactive hydrogen atoms. Illustrative of the latter are diols, such as ethylene glycol, triethylene glycol, 1,2-propylene glycol, and the like.

When the organic functional initiator is reacted with the lactone, a reaction occurs that can be represented in its simplest form by the equation

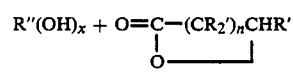

-continued

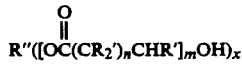

wherein n=3–6, preferably 4.

In this equation, the organic functional initiator is the R"(OH)$_x$ and the caprolactone is

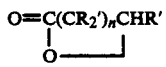

This can be caprolactone itself or a substituted caprolactone wherein R' is an alkyl, alkoxy, aryl, cycloalkyl, alkaryl or aralkyl group, and R" is an alkyl or alkoxy group, all as shown in U.S. Pat. No. 3,169,945, or modified caprolactones where a caprolactone polyol is reacted with (1) an anhydride of a polycarboxylic acid or (2) a polyisocyanate and an anhydride of a polycarboxylic acid or (3) a diepoxide and an anhydride of a polycarboxylic acid, as shown in U.S. Pat. No. 4,076,674. The modified caprolactone polyols can be used either in their liquid form or they can be dispersed in water after neutralization with an amine before blending with the waterborne phenoxy resin.

Another important class of modifier resins are those known as polyalkylene glycols, particularly polyethylene glycols (often referred to as "PEGs"). These materials are reaction products of a "starter" alcohol with an alkylene oxide (e.g., ethylene oxide, propylene oxide, tetramethylene oxide, etc.), and may be water-soluble or insoluble, depending upon composition.

Yet another, and highly preferred, class of modifier resins is the polyesters formed by reaction of polybasic acids with polyhydric alcohols, especially those listed in title 175.300 of chapter 21 CFR of the U.S. Food and Drug Administration. These especially include: polyethylene adipate, polypropylene adipate, polybutylene adipate, polydiethylene glycol adipate, polyalkylene sebacates, and the like.

Still another preferred class of modifier resins is the simple diols and polyhydroxy compounds, for example, the monoester of neopentyl glycol and hydroxypivalic acid (available as Esterdiol-204 sold by the Union Carbide Corporation.) This class includes a diverse variety of substances that includes tributyl citrate, castor oil, and alkoxylates (reaction products with olefin oxides such as ethylene oxide or propylene oxide), such as the ethoxylate of Esterdiol-204, known commercially as Esterdiol-380, ethoxylates of bisphenol-A, ethoxylates of castor oil, the lower molecular weight alkyd resins, especially the water-dispersible types, and the lower molecular weight acrylic polyols that are based on polymerization of acrylic esters with hydroxy-functionalized acrylic monomers such as hydroxyethyl acrylate.

Numerous other useful modifier resins can be identified by those skilled in the art based upon routine experimentation using the guidelines provided above. Such resins may be known in the art as, e.g., plasticizers, drying oils (especially those having hydroxyl functionality, and vinyl resins such as polyvinyl butyral, polyvinyl formal, and polyvinyl pyrrolidone, among others.

The Blends

It is essential to the practice of this invention that the modifier resin has a glass transition temperature (Tg) below that of the waterborne phenoxy resin in order that it will be able to impart a measureable flixibilizing effect on the waterborne phenoxy resin, while at the same time contributing to the lowering of the Tg of the modified system such that the filming temperature can be lowered to the extent that room temperature filming is made possible. The filming temperature can also be lowered by increasing the level of coalescing solvent because it lowers the Tg of the modified system. Glass transition temperatures of the modified systems can be predicted by use of the well known Fox equation:

$$\frac{1}{TgB} = \frac{Wp}{TgP} + \frac{Wm}{TgM} + \frac{Wcs}{TgCS}$$

where TgB is the Tg of the blend, Wp, Wm, and Wcs are the respective weight fractions of the waterborne phenoxy, the modifier, and the coalescing solvent, and TgP, TgM, and TgCS are respectively the Tg's of the waterborne phenxoy, the modifier and the coalescing solvent. Lowering of the Tg of the modified system by increasing the level of the coalescing solvent alone is, however, undesirable because the VOC is increased and has no permanent effect since the coalescing solvent evaporates completely from the final coating. Thus, the level of the coalescing solvent is important in controlling the filming temperature but not in the permanent enhancement of flexibility of the modified system in the final dried and coated form. The Tg lowering effect in the final coating and hence the permanent flexibilizing effect is seen from the above equation to depend only on the Tg of the modifier and the amount of it used in the blend, because the term for the coalescing solvent drops out (i.e., Wcs=0). The Tg-lowering effect in the final coating thus is greater the lower the Tg of the modifier and the amount that is used. The preferred waterborne phenoxy resins have a Tg of about 100° C. It is preferred that modifiers be used that lower the Tg of the blends to 60° C. or below in order to insure that the desired flexibility is obtained, on the one hand, and that the desired filming occurs without having to inordinately increase the level of the coalescing solvent, on the other hand. Generally, this means that modifiers with glass transition temperatures below room temperature are preferred so that the levels of modifier required to produce the desired lowering of the glass transition temperature in the blends is not inordinately high.

In formulating coatings within the scope of this invention, various important considerations should be kept in mind. Since phenoxy resins themselves confer properties on the coating which are desirable for corrosion resistance (e.g., barrier properties) and for physical handling (e.g., anti-blocking), the concentration of the phenoxy resin should be maintained as high as possible, consistent with the need to be able to deform the coating during the manufacture and to meet the bake cycle required. Similarly, it is desirable to maintain the Tg of the phenoxy/modifier resin blend as high as possible, consistent with the need to be able to deform, in order to prevent blocking of the coated metal when stored with adjacent surfaces in contact with each other, e.g., in roll or stacked sheet form.

For the purpose, then, of avoiding blocking of the final coatings, the blend Tg with no coalescing solvent remaining should not be below 30° C. and preferably above about 40° C. One way this condition can be met while using high levels of a modifier especially of a low glass transition temperature, which would be called for where the highest flexibility is desired, is to crosslink the final coatings. Thus, if the intended usage of the modified systems is in a baked coating, such as in a coil coating or can coating process, then advantage can be taken of the use of more modifier to enhance the flexibility. Where only room temperature drying of the final system is allowed, then of necessity the amount of modifier used would be more limited. In summary, then, the Tg of the final dried, modified coating would fall in the range of 30 to 60° C. and preferably in the range of 40 to 60° C.

As previously indicated, this invention comprises blends of ionic, neutralized carboxyl-bearing, water-borne phenoxy resin (or mixtures thereof) with one (or mixtures of) water-borne modifier resin which has no significant electronic charge (i.e., is neutral or essentially neutral) and is not carboxyl-bearing to any significant extent. Surprisingly, such ionic/non-ionic aqueous emulsions have been found to be not only remarkably compatible and stable in the emulsion form, but also appear to interact in an entirely unexpected, and not well understood, way to minimize or eliminate premature coalescence during film-forming. This unusual and extremely advantageous feature permits the present blends to be utilized successfully in a multiplicity of coating applications. While in certain applications it may be desirable to apply the blends as manufactured (or with appropriate dilution), in many other instances it may be desirable to load the blends with, e.g., particulate materials such as zinc powder, paint pigments, and the like.

It is believed that solubility of the modifier resin in the phenoxy resin while in the dispersed form or in water may not be necessary to achieve the benefits of the invention. Thus, it appears to be necessary to accomplish only an intimate admixture such as occurs ordinarily in an emulsion system. Without intending to be bound by any particular theory, it might be envisioned that the water-borne phenoxy molecule would behave as a surfactant for the modifier as a way to achieve the intimate admixture of the modifier and the waterborne phenoxy.

To attain maximum efficaciousness, however, it would be envisioned that the modifier would have to exhibit a measurable solubility in the resin as the system is being filmed. The preferred modifiers would normally be liquids below about 100° C. and preferably would melt below about 70° C. Blending of the modifier in its solid form is not preferred, as it would be difficult to achieve the necessary intimate admixing with the water-borne phenoxy resin. Also, using temperatures above about 100° C. in the blending is not preferred as there is the danger of coalescence of the water-borne phenoxy resin. (Coalescence is the process, as indicated in the previous discussion, where a fusion of the water-borne phenoxy resin particles commences upon heating.) Clearly, coalescence must be avoided until the final coating is made. The onset of premature coalescence would be recognized by those skilled in the art as rendering the system totally impractical.)

It is highly desirable to avoid using as a modifier resin, or otherwise having present in the blend, a substance with strong solvency for phenoxy resins, e.g., a low molecular weight ketone. These substances would be expected to attack the emulsified phenoxy particles and promote solution in spite of the presence of the water. This is the well-known mechanism of premature coalescence of water-borne resinous substances. In fact, if a volatile, low molecular weight ketone is added to a water-borne phenoxy resin dispersed in water, coalescence is an almost inevitable result. The early stages of coalescence are manifested by an increase in viscosity of the system. As coalescence becomes more advanced, gellation, and finally complete solution of the resin occurs. In order to prevent the undesirable manifestations of coalescence by the blending with such powerful solvents for the phenoxy resins, it is necessary to perform the additions under high water dilution. The result is an undesirable reduction of the solids content of the system, even though it would be anticipated that a reduction of the filming temperature and increase in the flexibility would result. This obvious approach would also suffer from two other very serious deficiencies:

(1) the flexibility increase would not be permanent, as over time the solvent would evaporate;

(2) the presence of the added solvent would raise the VOC.

With less aggressive phenoxy solvents, practical systems within this invention can still result because much less water is needed to avoid the danger of premature coalescence. Thus, the class of solvents known as glycol ethers can be used when only modestly diluted with water to avoid premature coalescence. This is important and intended to be part of this invention, because addition of a glycol ether along with a nonvolatile, flexibilizing modifier results in systems of improved gloss. Furthermore, and equally importantly, VOC compliant systems still result because the amount of glycol ether required to produce the ultra high gloss is very low.

The mechanism by which the neutral and relatively non-volatile substances of this invention provide the benefits as outlined, without resulting in coalescence of the high solids emulsions, is not known. Without wishing to be bound by any particular theory or preconceived beliefs, it is possible that success rests upon the ability of the modifier to initiate coalescence only when most of the water has evaporated in the drying of the coating, which is most desirable. Thus, by this speculation, these substances are behaving as the ideal coalescents: showing minimal affinity for the dispersed resins in the emulsions but providing the necessary solvency for coalescence when the coatings are drying. An additionally desirable characteristic of these modifiers is that they are also of low volatility, which allows a lowering of the VOC of the blends.

It will be appreciated that phenoxy resins, since they contain pendant hydroxyl groups, are crosslinkable by materials, e.g., melamines, isocyanates, phenolics, urea-formaldehydes, etc., which are reactive with hydroxyl groups.

Where used, crosslinkinq agents should be provided in sufficient concentration to maximize blush and solvent resistance while retaining flexibility for improved draw and adhesion performance. Such formulation is within the skill of the art, but typically the crosslinker will be about 2–10%, preferably about 4–8%, based on total resin solids.

Waterborne phenoxy resins are readily coated at the appropriate viscosities using all standard application methods. Roller coating can be performed at 30–35% solids and air spray at 20–26% solids. As the dispersions can be produced at 35–40% solids, some dilution is usually necessary to achieve the proper application viscosities. Dilution should not be done with pure solvent as it will induce coalescence. The best procedure is to use an aqueous solution. The best flowout is obtained using Hexyl Cellosolve Solvent in the dilution. Butyl Cellosolve Solvent is next best, followed by Butyl Carbitol Solvent. This is the order in which these solvents depress the surface tension in the diluted formulations. When cross-linker is used, it should be dissolved in the solvent before diluting with water. Acidic crosslinkers, like certain phenolic resins, should first be neutralized with an amine, i.e., dimethylethanolamine. Highly acidic conditions must be avoided in the dispersions to avoid seeding. Working at a pH much below about 6 is not recommended with waterborne phenoxy resins. On the other hand, high pHs, as produced by addition of amines over and above that needed to neutralize the carboxyls, have no known deleterious effect. In fact, such additions can be beneficial in improving flowout with water dilution.

When a particulate material is included in the coating composition, its concentration is not narrowly critical, but usually should be less than about 95% by weight of the total coating, preferably about 65% to about 90%. In the preferred, zinc-rich embodiment of the invention, commercially available zinc pigments having a particulate size of about 2 to about 15 microns may conveniently be used. It is preferred to use zinc pigment having an average particle size of about 6 to about 7 microns.

It will be understood as well that the coating compositions of this invention may contain functional additives known to the art, e.g., crosslinkinq agents, suspending agents, viscosity modifiers, colorants, antioxidants, and the like.

EXAMPLES

The following examples illustrate, but are not in any way intended to limit, the present invention.

Test procedures used in the examples are as follows:

Chemical Resistance (Double MEK Rubs)

Measures the resistance of the cured film to attack by MEK. A film coating surface is rubbed with an MEK-soaked cheesecloth back and forth with hand pressure. Such a rub back and forth is designated as one "double-rub." The effect that a certain number of double-rubs has on the film coating surface is reported by a number in parentheses following the number of double-rubs. The number indicates the number of double-rubs required to bridge the film down to the metal surface, usually seen at the edge of the film.

Reverse or Face Impact Resistance

Measures the ability of a given film to resist rupture from a falling weight. A Gardner Impact Tester using an eight-pound dart is used to test the films cast and cured on the steel panel. The dart is raised to a given height in inches and dropped onto the reverse or face side of a coated metal panel. The inches times pounds, designated inch-pounds, absorbed by the film without rupturing is recorded as the reverse or face impact resistance of the film.

Pencil Hardness - ASTMD-3363-74

The rating system for pencil hardness is as follows 6B-5B-4B-3B-2B-B-HB-F-H-2H-3H-4H-5H-6H
Softer                    Harder

Cross Adhesion

Refers to a test using 10 parallel, single-edged, razor blades to scribe test films with 2 sets of perpendicular lines in a crosshatch pattern. Ratings are based on the amount of film removed after applying and subsequently pulling a contact adhesive tape (Scotch Brand 606) away from the surface of a scribed coating at a 90 degree angle in a fast movement. It is important to carefully apply and press the tape to the scribed coating to eliminate air bubbles and provide a good bond. Adhesion is reported as the percent of film remaining on the substrate, with a 100 percent rating indicating complete adhesion of the film to the substrate.

Gloss

The dried films are measured for the percentage of incident light that is reflected from the surface of the coatings at angles of reflection of 20 and 60 degrees to the plane of the coated surface. This is done using the "GARDCO" LCD portable glossmeter. (Paul N. Gardner Company Inc., Pompano Beach, Florida). The values meet the ASTM designation: D 523-80 standard test method for specular gloss.

OT Bend

The waterborne phenoxy dispersion is mixed with the cross-linker and coated by drawing down on a cold-rolled steel panel at 0.5 mil dry film thickness. The coating is baked at 190° C. for 5 minutes in a forced draft oven. The panel is cooled and bent back on itself 180 degrees with the coating on top of the bend. The panel is placed in a vise and subjected to 1500 lbs. pressure to effect the bend. The inner uncoated faces of the panel wings completely touch one another so that at the apex of the bend there is zero angle between the wings- hence the "OT bend" test. An aqueous copper sulfate/copper chloride solution is then applied at the bent edge. The film should be free of cracks or black rusty spots on the bare metal surface under the film to pass the OT bend test. The appearance of black rusty spots on the surface of the metal under the film indicates that the coating has been penetrated down to the metal via a crack.

Blush

A panel is prepared and cured as for the OT bend test, but the metal panels used are aluminum or tin-free steel, which are standard beverage and food packaging metals, respectively. The coated panel is cut into a 1×4-inch strip and immersed half way into boiling water for 30 minutes. After removing from the water, the coating is immediately rated on a scale of 1 to 10, 10 being no blush or stain or any other visual change in the coating or loss of adhesion.

10% HCl

Two drops of 10% hydrochloric acid solution are placed on the coated panel at least one inch from either side of a four-inch coated panel. The spot is covered with a watch glass to prevent evaporation of the reagent. After 16 hours of standing at room temperature, the panels are rinsed with water to remove the reagent and allowed to stand until dry. To pass the test, the area that was in contact with the reagent must show no visual change or loss of adhesion using the 6-10 tape.

10% NaOH

Two drops of 10% sodium hydroxide are placed on the coated panel at least one inch from either side of a four-inch coated panel. The spot is covered with a watch glass to prevent evaporation of the reagent. After 16 hours of standing at room temperature, the panels are rinsed with water to remove the reagent and allowed to stand until dry. To pass the test the area that was in contact with the reagent must show no visual change or loss of adhesion using the 6-10 tape.

Relative Evaporation Rate

A 1.0 g-quantity of the test solvent is placed in a tared aluminum weighing dish, and 1.0g of butyl acetate is placed in another tared aluminum weighing dish. Both dishes are placed on a flat surface at ambient conditions and covered with a 24"×24"×24" cardboard box. The dishes are periodically weighed and returned to the box until all the solvent has evaporated from each dish. The time for complete evaporation of the test solvent is measured compared to that of butyl acetate, and is thus referred to an arbitrary time scale with the time for butyl acetate set to a value of 100.

EXAMPLE 1:

CAPROLACTONE POLYOL AS MODIFIER

To a 30-gallon, 316 stainless steel vessel, equipped with a turbine type agitator and a water-steam jacket for providing temperature control were charged 180 pounds of waterborne, neutralized, colloidal phenoxy resin known as PKHW-35. (PKHW-35 is manufactured by the Union Carbide Corporation. The batch used had a Brookfield RVT viscosity of 1000 cps (#4 spindle at 50 rpm), a weight solids content of 37.2%, and a pH of 7.5). The agitator was set at 75 rpm and 20.16 pounds of de-ionized water were fed by gravity from a 5-gallon polyethylene container equipped with a bottom-opening valve through a dip tube that extended into the reaction vessel above the liquid level there. The water was added over 45 minutes at a steady temperature of 20° C., with full jacket cooling. After 10 minutes the agitator speed was adjusted to 60 rpm, the jacket temperature controller setting was adjusted to 35° C., and 10.04 pounds of TONE ® POLYOL 0201 were added from the polyethylene container over 3 minutes. (TONE ® POLYOL 0201 is manufactured by Union Carbide Corporation by polymerization of caprolactone. The sample used had a hydroxyl number of 214 mg. KOH per g. of sample). The agitator speed was adjusted to 73 rpm, and the blend was stirred for 3 additional hours. At the end of this time the material temperature was 24° C. The blend was then discharged through a 75-micron filter bag into a 5-gallon polyethylene carboy for storage. The yield of product was 201.5 pounds. The viscosity measured a steady 622 cps after 15 days of storage. (The initial viscosity was 496 cps, which was lower due to trapped air.) The VOC was calculated to be 1.7 lbs./gallon, correcting for the water, as is required by the EPA.

A coating was prepared by drawing down the creamy white appearing-blend on a cold-rolled steel panel using a Meyer rod to control the thickness. The resulting film dried at room temperature to a completely clear, highly glossy film in 30 minutes. Preparing a similar film of the PKHW-35 without the modifier resulted in an opaque film with no gloss whatsoever.

After additional air drying overnight, the following properties were measured on the film prepared from the blend:

| | |
|---|---|
| Dry Film Thickness, mil | about 0.25 |
| Gloss | |
| 60° | 80 |
| 20° | 60 |
| Reverse Impact, in.-lb. | >160 |
| OT Bend | Pass |
| Crosshatch Adhesion, % retained | 100 |
| Pencil Hardness | 2H |
| Acid Resistance (10% HCl/16 hrs.) | Excellent |

The very high reverse impact and ability to pass the very severe OT Bend test attest to the high flexibility of the blend.

EXAMPLE 2:

CROSS-LINKED COATINGS

High quality cross-linked coatings can also be prepared; they retain the excellent balance of properties of the air-dry versions. Such coatings could find ready application in food and beverage can manufacture, where the coating is applied to flat metal coil stock and then cured to the cross-linked state on high speed lines, followed by cutting and shaping into the final can shape by the various drawing processes. Existing water-borne can coating resins lack the necessary flexibility to be used in this manner and are known to be undesirably high in VOC, because they must be applied by spraying onto the already-formed can. In spraying, it is well known that the water-borne coating must be diluted with water to a low solids content in order to have the proper viscosity. In so doing, the addition of extra solvent is required to offset the loss of wetting due to the addition of the water. In contrast, the blend of this invention would be applied by direct roll coating, where no dilution at all would be required. The metal wetting characteristics of the blends as produced are in the range needed for proper metal coil coating operations.

To each of three samples of the blend of Example 1 was admixed one of three different cross-linking agents, as described below. Coatings were applied as in Example 1 and baked for 5 minutes at 190° C., producing a dry film thickness of about 0.25 mil.

Properties of cross-linked coatings on cold-rolled steel were:

| | CROSSLINKER | | |
|---|---|---|---|
| PROPERTY | CYMEL 370 | EP 560 | RESIMENE 2040 |
| Gloss | | | |
| 60° | 85 | 80 | 85 |
| 20° | 60 | 60 | 60 |
| OT Bend | Pass | Pass | Pass |
| Reverse Impact in.-lb. | >160 | >160 | >160 |
| Crosshatch Adhesion | | | |
| % Retained | 100 | 100 | 100 |
| Pencil Hardness | 2H | 6H | 6H |
| Chemical Resistance | | | |
| Double MEK Rubs | >100 | >100 | >100 |
| Blush Resistance | Excellent | Excellent | Excellent |
| 10% HCl | Excellent | Excellent | Fair |
| 10% NaOH | Fair | Excellent | Fair |

Cymel 370 is a melamine-formaldehyde resin manufactured by the American Cyanamide Company and was used at 4 phr.

EP 560 is an etherified phenolic resin manufactured by the Monsanto Chemical Company and was used at 8 phr after being neutralized to pH 7 by mixing with dimethylethanolamine.

Resimene 2040 is a modified melamineformaldehyde resin manufactured by the Monsanto Chemical Company and was used at 8 phr after being neutralized to pH=7 by mixing with dimethylethanolamine.

The blush tests were run on coatings made on aluminum and tin-free steel by immersion in boiling water for 1 hour. The other chemical tests were run on coatings made on cold-rolled steel by exposing the coating to the chemical for 16 hours at 25° C.

EXAMPLE 3:
POLYBUTYLENE ADIPATES AS MODIFIERS

Into a 3-liter, 3-necked round-bottom flask equipped with a mechanical stirrer, thermometer, and a drop funnel were placed 346 g. of deionized water and 134 q. of solid poly(1,4-butane adipate), also known as polybutylene adipate. (The polybutylene adipate used is manufactured by the Witco Chemical Company under the name of Formrez 44-225. The reported hydroxyl number is 225 mg. KOH/q. of sample.) Stirring and heating to 60° C. were commenced. After the temperature reached 60° C., 2000 g. of PKHW-35 were added from the drop funnel over 30 minutes.

Heating was adjusted so that the contents of the flask remained at 55°-60° C. during the addition. The PKHW-35 used was from the same batch as that used in Example 1. The temperature was adjusted to a constant 60° C. and stirring was maintained for an additional hour after all the PKHW-35 had been added. The blend was cooled to room temperature and filtered through a paint cone into a polyethylene bottle for storage. The filtered product was recovered in a nearly quantitative yield. The RVT Brookfield viscosity measured 336 cps (#4 spindle at 50 rpm) after one day. One week later, the viscosity measured 328 cps, indicating that the product was stable. The VOC was calculated to be 1.9 lbs./gal.

Coatings were prepared as in Example 2 on cold-rolled steel with the following results:

| PROPERTY | AIR DRY[1] | BAKED[2] | 10 PHR EP560[2] |
|---|---|---|---|
| Dry Film Thickness, Mil (approx.) | 1.0 | 0.8 | 0.7 |
| Gloss | | | |
| 60° | 70 | 70 | 100 |
| Pencil Hardness | 2H | 4H | 5H |
| Impact, in.-lbs. | | | |
| Forward | >160 | >160 | >160 |
| Reverse | >160 | >160 | >160 |
| OT Bend | Pass | Pass | Pass |
| Crosshatch Adhesion | | | |
| % Adhered | 100 | 100 | 100 |
| Chemical Resistance | | | |
| (Double) MEK Rubs | — | — | 100 |
| 10% HCl | — | — | Excellent[3] |
| 10% NaOH | — | — | Excellent[3] |
| Boiling Water | — | — | Excellent[3] |

[1] A clear, glossy film was obtained in 30 minutes of air drying at room temperature. Properties were determined after 24 hours of air drying.
[2] Baked 5 minutes at 190° C.
[3] Exposure of the coatings to these chemicals was without any visual effect whatsoever.
Conditions were:
(a) 10% HCl, 10% NaOH = 16 hours at 25° C.
(b) Boiling Water = 90 minutes at 121° C. with no blush on an aluminum substrate. The coating would receive a 10 (a perfect rating) in the can coating beverage test.
(c) Boiling Water = 90 minutes at 121° C. with no blush on tin-free steel substrate. The coating would receive a 9 (an almost perfect rating) in the can coating vegetable can test.

EXAMPLE 4:
POLYBUTYLENE ADIPATE AS MODIFIER IN A HIGH-GLOSS FORMULATION BY ADDING EXTRA COALESCING SOLVENT

To an 8-ounce, tin-plated paint can equipped with an air driven mechanical stirrer with a propeller blade, were added 9.3 g. of Butyl CELLOSOLVE ® Solvent and 37.3 g. of water. After brief mixing to effect solution, the can was immersed in a water bath held at 60° C. Then, 6.2 g. of Formrez 44-225 were added. After all of the polybutylene adipate had melted, 100.6 g. of PKHW-35 were added with good stirring to the two-phase liquid system in the can. The addition of the water-borne phenoxy was carried out over 20 minutes. Stirring was continued for an additional 45 minutes, and then the can was removed from the bath and sealed and allowed to stand overnight. The next day, the can was opened and the viscosity was found to be 512 cps. The viscosity was checked after 8 days' storage at 25° C. and found to be unchanged. There was no evidence of settling or any phase separation. A sealed sample was placed in a 53° C. oven for 18 days, and it was found that the viscosity had decreased only very slightly (to 480 cps), again with no evidence of settling or phase separation. All these results taken together indicate that the emulsion was stable. The VOC was calculated to be 2.9 lbs/gal. Drawdowns were made as in Example 2. The following table lists properties on three different substrates after air drying at 25° C. for 7 days.

| PROPERTY | SUBSTRATE BONDERITE 1000 | COLD-ROLLED STEEL | ALUMINUM |
|---|---|---|---|
| Dry Film Thickness Mil (approx.) | 1.1 | 1.1 | * |
| Gloss** | | | |
| 60° | 104 | 104 | 123 |
| 20° | 78 | 55 | 78 |
| Pencil Hardness | 3H | 2H | HB |
| Crosshatch Adhesion | | | |
| % Retained | 100 | 100 | 90 |
| Impact Resistance, in-lb | | | |
| Forward | >160 | >160 | 60*** |
| Reverse | >160 | >160 | 60*** |
| OT Bend Test | PASS | PASS | — |
| Wedge Bend Test | — | — | PASS |

*Thickness on aluminum = 9.5 mg/in²·
**Gloss was determined after 3 hours of air drying.
***Substrate failed.

The following table lists properties after baking at 190° C. for 5 minutes.

| PROPERTY | SUBSTRATE | | | |
|---|---|---|---|---|
| | BONDERITE 1000 | COLD-ROLLED STEEL | ALUMINUM | TIN-FREE STEEL |
| Dry Film Thickness Mil (approx.) | 1.1 | 1.1 | * | 1.1 |
| Gloss | | | | |
| 60° | 94 | 94 | 110 | 113 |
| 20° | 57 | 56 | 61 | 82 |
| Pencil Hardness | 2H | H | H | 2H |
| Crosshatch Adhesion | | | | |
| % Adhered | 100 | 100 | 100 | 100 |
| Impact Resist., in/lb | | | | |
| Forward | >160 | >160 | — | — |
| Reverse | >160 | >160 | — | — |
| OT Bend Test | PASS | PASS | — | PASS |
| Wedge Bend Test | — | — | PASS | — |

*Thickness on aluminum = 11.5 mg/in.$^2$

EXAMPLE 5:
EFFECT OF GLYCOL ETHER SOLVENT ON GLOSS

In an 8-ounce bottle equipped with an air-driven stirrer as in Example 4, were placed 100 g. of the product of Example 3. Varying amounts of Butyl CELLOSOLVE® Solvent, and in one case Hexyl CELLOSOLVE® Solvent, were added with good stirring at room temperature. After 20 minutes of mixing, the products were filtered and drawdowns were made as described in Example 2. The coatings were air dried for 3 hours and then the gloss was determined and the VOCs were calculated. Results are summarized below:

| EXAMPLE 3 PRODUCT | 100 g | 100 g | 100 g | 100 g | 100 g | 100 g |
|---|---|---|---|---|---|---|
| Butyl CELLOSOLVE ® Solvent | 0 | 2.3 g. | 4.6 g. | — | 7.0 g. | 9.3 g. |
| Hexyl CELLOSOLVE ® Solvent | 0 | 0 | 0 | 4.6 g. | 0 | 0 |
| Gloss, 60° | 70 | 99 | 99 | 86 | 99 | 98 |
| VOC, lbs/gal | 1.9 | 2.2 | — | — | — | 3.1 |

EXAMPLE 6:
ESTERDIOL AS MODIFIER

To an 8-ounce jar equipped with a mechanical stirrer were added 100 g. of PKHW-35. The PKHW-35 used had a viscosity of 1184 cps., a solids content of 38.8%, and a pH of 7.6. With moderate agitation, 46.6 g. of a 20% (w/w) solution of Butyl CELLOSOLVE® Solvent in water were added over 20 minutes. Then 6.4 g. of solid Esterdiol-204 were added over 20 minutes. (Esterdiol-204 is manufactured by the Union Carbide Corporation and is known chemically as 2,2-dimethyl-3-hydroxypropyl-2,2-dimethyl-3-hydroxypropionate.) The stirrer was adjusted to high speed and stirring was continued for one hour. The blend was recovered, after filtering through Bolting Cloth, in essentially quantitative yield. The viscosity of the blend measured 128 cps. A clear and glossy film on cold-rolled steel was prepared as in Example 2 after 30 minutes of air drying. The VOC was calculated to be 2.8 lbs/gal.

EXAMPLE 7:
WATERBORNE PHENOXY PROCESS WITH POLYBUTYLENE ADIPATE PRESENT DURING GRAFTING

Into a 3-liter, 4-necked flask equipped with a thermometer, condenser, mechanical stirrer and nitrogen inlet, were placed

| PKHH phenoxy resin | 240 g. |
|---|---|
| Methylethyl ketone | 720 g. |
| Formrez 44-225 | 35 g. |

A solution was made by stirring for 6 hours at room temperature. Then the following mixture was added:

| Methylacrylic acid | 40.4 g. |
|---|---|
| Styrene | 9.0 g. |
| Ethyl acrylate | 1.0 g. |

After brief mixing, a solution consisting of

| Benzoyl peroxide (98%) | 7.8 g. |
|---|---|
| Methylethyl ketone | 30 g. | was added. The system was purged of air by nitrogen sparginq for 30 minutes and then refluxed for 2 hours. The modified, carboxylated phenoxy resin was dispersed in water as follows:

To a 3-liter flask equipped with a mechanical stirrer and a drop funnel were placed 730 g. of modified, carboxylated phenoxy varnish (from above). Next, 117 g. of Butyl Cellosolve Solvent were added. After mixing for 5 minutes, 35 g. of dimethylethanolamine were added. After mixing for 15 minutes, 930 g. of water were added over 20 minutes with good agitation. The milky dispersion was then concentrated under vacuum to remove the methylethyl ketone and some of the water. The resultant dispersion had a viscosity of 800 cps., a solids content of 38%, and a pH of 6.8. A clear, flexible film resulted after 30 minutes of air drying of a 2-mil (wet) drawdown on a cold-rolled steel panel.

What is claimed is:

1. An aqueous coating composition comprising:
   (a) a waterborne, neutralized, carboxyl-bearing phenoxy resin,
   (b) abut 5 to about 50% by weight of the total resin of a modifier resin which is relatively soft in comparison to the phenoxy resin and is compatible with the phenoxy resin and has:
      (1) a reduced viscosity of about 0.1 to about 2 dL/g in tetrahydrofuran at 25° C.;
      (2) a Tg of about −120 to about 30° C.;
      (3) a solubility in Cellosolve acetate at 25° C. of at least about 1 g per 100g of solvent;
      (4) a number average molecular weight of about 500 to about 90,000,
   said modifier resin being a neutral, non-carboxyl-bearinq, liquid or waterborne resin which will form a clear film with the waterborne phenoxy resin at 25-300 degrees centigrade upon evaporation of any solvents and all the water in the system;
   (c) optionally, about two to about 25% by weight of the total emulsion of a coalescing solvent, with a relative evaporation rate above about 0.001 (butyl acetate=100), for the waterborne phenoxy-modifier resin mixture;
   (d) optionally, a particulate material;
   (e) optionally, a crosslinker;
   (f) water in an amount sufficient to disperse the phenoxy and modifier resins therein.

2. A coating composition of claim 1 wherein the concentration of the modifier resin is about 1 to about 15% by weight.

3. A coating composition of claim 1 wherein the modifier resin has:
   (1) a reduced viscosity of about 0.2 to about 1 dL/g in tetrahydrofuran at 25° C.; and
   (2) a Tg of about −100 to about 0° C.

4. A coating composition of claim 1 wherein the phenoxy resin has a carboxyl content of about 2 to about 10%.

5. A coating composition of claim 1 wherein the modifier resin is a polyester.

6. A coating composition of claim 5 wherein the modifier resin is an aliphatic polyester.

7. A coating composition of claim 6 wherein the aliphatic polyester is derived from epsilon-caprolactone.

8. A coating composition of claim 7 wherein the aliphatic polyester is a caprolactone polyol.

9. A coating composition of claim 6 wherein the alphatic polyester is an adipate.

10. A coating composition of claim 9 wherein the adipate is a polyalkylene adipate.

11. A coating composition of claim 10 wherein the polyalkylene adipate is polybutylene adipate.

12. A coating composition of claim 1 wherein the modifier resin is a polyalkylene glycol.

13. A coating composition of claim 12 wherein the polyalkylene glycol is a polyethylene glycol.

14. A coating composition of claim 13 wherein the polyethylene glycol has a number average molecular weight of about 200 to about 15,000.

15. A coating composition of claim 1 containing a crosslinker.

16. A coating composition of claim 15 wherein the crosslinker is a melamine resin.

17. A coating composition of claim 15 wherein the crosslinker is a phenolic resin.

18. A coating composition of claim 1 which contains a coalescing solvent.

19. A coating composition of claim 18 wherein the coalescing solvent is a glycol ether.

20. A coating composition of claim 19 wherein the glycol ether is $$CH_3CH_2CH_2CH_2OCH_2CH_2OH.$$

21. A coating composition of claim 19 wherein the glycol ether is $$CH_3CH_2CH_2CH_2CH_2CH_2OCH_2CH_2OH.$$

22. An article comprising a metallic substrate and adhering thereto a coating composition of claim 1.

23. A method for preparing a coating composition of claim 1 comprising:
   (a) adding, with agitation and at a temperature of about 25 to about 40° C., water to a waterborne, neutralized, carboxyl-bearing phenoxy emulsion, said water being sufficient in amount to result in a phenoxy solids concentration of about 20 to about 30%;
   (b) increasing the temperature of the emulsion to about 50 to about 60° C.;
   (c) adding, at increased agitation, about 5 to about 50% by weight of the total resin of a modifier resin which is a neutral, non-carboxyl-bearing, liquid or waterborne resin which will form a clear film with the waterborne phenoxy resin at 25-300 degrees centigrade upon evaporation of any solvents and all the water in the system;
   (d) cooling the composition to room temperature;
   (e) optionally, adding, with agitation, about 2 to about 25% by weight of the total emulsion of a coalescing solvent, with a relative evaporation rate above about 0.001 (butyl acetate=100), for the waterborne -phenoxy-modifier resin mixture.

* * * * *

UNITED STATES PATENT AND TRADEMARK OFFICE
CERTIFICATE OF CORRECTION

PATENT NO. : 4,954,553
DATED : September 4, 1990
INVENTOR(S) : Robert N. Johnson and Ismael Colon It is certified that error appears in the above-identified patent and that said Letters Patent is hereby corrected as shown below:

Column 3, line 47, "g" should read -- % --.
Column 5, line 15, "60mole" should read -- 60 mole --.
Column 8, line 19, "nation" should read -- designation --.
Column 9, line 7, "10degrees" should read -- 10 degrees --.
Column 10, line 15, "n-gutoxy" should read -- n-butoxyethyl --.

Column 19, line 47, "3" should read -- 30 --.
Column 24, line 57, "sparginq" should read -- sparging --.
Column 25, line 9, "abut" should read -- about --.

Signed and Sealed this

Third Day of March, 1992

Attest:

HARRY F. MANBECK, JR.

*Attesting Officer*  *Commissioner of Patents and Trademarks*